(12) United States Patent
Deng et al.

(10) Patent No.: US 10,668,586 B2
(45) Date of Patent: Jun. 2, 2020

(54) INTEGRATED PROCESSING MACHINE FOR POSITIONING, TRIMMING, AND PUNCHING CEILING SPLICING STRUCTURES

(71) Applicant: DONGGUAN UNIVERSITY OF TECHNOLOGY, Dongguan (CN)

(72) Inventors: Jun Deng, Dongguan (CN); Xiaowei Liu, Dongguan (CN)

(73) Assignee: DONGGUAN UNIVERSITY OF TECHNOLOGY, Dongguan (CN)

( * ) Notice: Subject to any disclaimer, the term of this patent is extended or adjusted under 35 U.S.C. 154(b) by 0 days.

(21) Appl. No.: 16/284,903

(22) Filed: Feb. 25, 2019

(65) Prior Publication Data
US 2019/0383000 A1    Dec. 19, 2019

(30) Foreign Application Priority Data
Jun. 13, 2018 (CN) .......................... 2018 1 0608482

(51) Int. Cl.
*B23P 23/04* (2006.01)
*B23B 41/00* (2006.01)
(Continued)

(52) U.S. Cl.
CPC ............ *B23P 23/04* (2013.01); *B23B 39/205* (2013.01); *B23B 41/00* (2013.01);
(Continued)

(58) Field of Classification Search
CPC ............. Y10T 83/8834; Y10T 29/5105; Y10T 29/5107; B26D 1/095; B26D 1/09; B23P 23/04
(Continued)

(56) References Cited

U.S. PATENT DOCUMENTS 1,003,965 A * 9/1911 Kennedy ................. B27B 27/02
                                                              83/446
4,407,179 A * 10/1983 Iwase ....................... B26D 1/09
                                                              83/865
(Continued)

FOREIGN PATENT DOCUMENTS

CN        108655745 A   * 10/2018
CN        108705679 A   * 10/2018
(Continued)

*Primary Examiner* — Erica E Cadugan
(74) *Attorney, Agent, or Firm* — Law Offices of Steven W. Weinrieb

(57) ABSTRACT

The present invention relates to an integrated processing machine for positioning, trimming and punching of the ceiling splicing structure, comprising a rack and a mounting base for processing at the lower part of the rack, which is provided with a lifting and clamping device passing through the rack cooperating with the splice plate, the upper part of the rack is provided with a processing port, which cooperates with a trimming and positioning device, the trimming and positioning device comprises a lifting cylinder for trimming and positioning disposed on the mounting base for processing, the lifting cylinder for trimming and positioning is connected with a mounting base for trimming and positioning, the mounting base for trimming and positioning is provided with a first trimming knife and a second trimming knife which cooperates with the two splice plates respectively, and the mounting base for processing is provided with a processing mechanism matching with the processing mating port and cooperating with two splice plates; In the present invention, the trimming and positioning device and the processing device are designed to cooperate with each other, the trimming and positioning device is able to complete the trimming of the side slits of the splice plates while positioning the two splice plates without interfering with the
(Continued)

operation of the hole and groove processing device, which greatly improves the efficiency of integrated processing.

10 Claims, 8 Drawing Sheets

(51) Int. Cl.
    *B23B 39/20*     (2006.01)
    *B26D 1/09*     (2006.01)
    *B26D 7/02*     (2006.01)
    *B24B 27/00*     (2006.01)
    *E04B 9/04*     (2006.01)
    *E04B 1/61*     (2006.01)
    *E04B 1/04*     (2006.01)

(52) U.S. Cl.
    CPC ...... *B24B 27/0023* (2013.01); *B24B 27/0076* (2013.01); *B26D 1/095* (2013.01); *B26D 7/025* (2013.01); *E04B 1/043* (2013.01); *E04B 1/6104* (2013.01); *E04B 9/04* (2013.01); *Y10T 29/5107* (2015.01); *Y10T 29/5143* (2015.01); *Y10T 29/5155* (2015.01); *Y10T 29/5158* (2015.01); *Y10T 83/8834* (2015.04); *Y10T 408/37* (2015.01)

(58) Field of Classification Search
    USPC .................................. 83/622; 29/26 R, 26 A
    See application file for complete search history.

(56) References Cited

U.S. PATENT DOCUMENTS

| | | | |
|---|---|---|---|
| 5,320,012 A * | 6/1994 | Abe | B26D 7/084 83/19 |
| 7,631,673 B2 * | 12/2009 | Salovaara | B26D 1/095 144/162.1 |
| 2005/0013673 A1 * | 1/2005 | Tucker | B23B 39/003 408/53 |
| 2019/0389021 A1 * | 12/2019 | Li | B21D 28/04 |

FOREIGN PATENT DOCUMENTS

| | | | | |
|---|---|---|---|---|
| CN | 208644644 U | * | 3/2019 | |
| CN | 208645695 U | * | 3/2019 | |
| JP | 51064989 U | * | 5/1976 | |
| JP | 62-249705 A | * | 10/1987 | |

* cited by examiner

INTEGRATED PROCESSING MACHINE FOR POSITIONING, TRIMMING, AND PUNCHING CEILING SPLICING STRUCTURES

FIELD OF THE INVENTION

The present invention relates to the field of plate processing device, particularly to an integrated processing machine for positioning, trimming and punching of the ceiling splicing structure.

BACKGROUND OF THE INVENTION

In the process of house decoration, a majority of people use the ceilings, most of which are suspended ceiling with peripheral edges covered and made of the plates. Due to the relatively large structure of the house, most often than not, the ceiling splicing structure will be applied, yet the existing ceiling splicing structure may cause cracking of wall paint for structural reasons. In view of this situation, a new ceiling splicing structure is developed, as shown FIG. 9-12, comprising a first splice plate (1) and a second splice plate (2), the side of the first splice plate (1) is provided with a first splicing block flush with the upper surface thereof, the middle part of the side of the second splice plate (2) is provided with a second splicing block which is cooperated with the first splicing block and connected with the first splicing block through a vertical splicing wooden pin (4), the distance between the upper side of the second splicing block and, the upper surface of the second splice plate (2) is consistent with the thickness of the first splicing block, the first splice plate (1) and the place where the first splicing block contacts with the second splicing block are provided with an adhesive layer (3), the lower surface of the second splicing block is provided with a steel wire mesh (6), the side of the steel wire mesh (6) is inserted into the first splice plate (1) and the second splice plate (2) through the fixed bolt of the wire mesh (8), the lower part of the steel wire mesh 6 is integrally connected with a concrete layer (7) flush with the lower surface of the first splice plate (1) and the second splice plate (2), a caulk compound layer of the first wall (5) is disposed between the second splicing block and the steel wire mesh (6), the lower end of the splicing wooden pin (4) penetrates into the concrete layer (7); the place where the first splice plate (1) and the second slicing plate (2) are cooperated with the fixed bolt of the wire mesh (8) is provided with a square mating groove, and the square mating groove is filled with a caulk compound layer of the second wall (9).

For the ceiling splicing structure of new type, both the first splicing block and the second splicing block need to be processed first, and then the side part of the splice plate under the first splicing block and the second splicing block shall be trimmed, after then the splice plate shall be processed with pin holes and square grooves, which is tedious in steps, complex in structure and hardly possible to achieve integrated operation.

SUMMARY OF THE INVENTION

The present invention aims to provide an integrated processing machine for positioning, trimming and punching of the ceiling splicing structure in which the trimming and positioning device and the processing device are designed to be cooperated with each other, the trimming and positioning device is able to complete the trimming of the side slits of the splice plates while positioning the two splice plates without interfering with the operation of the hole and groove processing device, which greatly improves the efficiency of integrated processing.

In order to achieve objects mentioned above, the technical solutions adopted in the present invention are as follow: an integrated processing machine for positioning, trimming and punching of the ceiling splicing structure comprises a rack and a mounting base for processing at the lower part of the rack, in which the mounting base for processing is provided with a lifting and clamping device which passes through the rack to be cooperated with a first splice plate or a second splice plate on the upper part thereof, the upper part of the rack is provided with a processing port, the processing port is cooperated with a trimming and positioning device, the trimming and positioning device comprises a lifting cylinder for trimming and positioning disposed on the mounting base for processing, the lifting cylinder for trimming and positioning is connected with a mounting base for trimming and positioning, the mounting base for trimming and positioning is provided with a first trimming knife and a second trimming knife which are cooperated with two splice plates respectively, and the height difference between the first trimming knife and the second trimming knife is equal to the spacing difference between a first splicing block and a second splicing block and the bottom surface of the splice plate, the mounting base for trimming and positioning is provided with a processing mating port, and the mounting base for processing is provided with a processing mechanism matched with the processing mating port and cooperated with two splice plates.

Further, the upper part of the lifting cylinder for trimming and positioning is connected with a lifting seat for trimming and positioning, the mounting base for trimming and positioning is mounted on the lifting seat for trimming and positioning through lifting link for trimming and positioning, the size specification of the lifting seat for trimming and positioning is larger than the size specification of the processing port, and the lifting seat for trimming and positioning is also provided with a processing mating port.

Further, the processing mechanism comprises a lifting cylinder for processing disposed on the mounting base for processing, the upper part of the lifting cylinder for processing is connected with a lifting mounting block for processing, the lifting mounting block for processing is provided with a processing conversion shaft and the processing conversion shaft is connected with a processing conversion motor, the processing conversion shaft is sleeved with a processing conversion tube, and the processing conversion tube is uniformly provided with a splicing pin hole processing device, a wire mesh pin hole processing device and a square groove processing device along the ring which are matched with the processing mating port.

Further, the splicing pin hole processing device comprises a splicing pin hole processing seat disposed on the processing conversion tube and matched with the processing port, the splicing pin hole processing seat is provided with a splicing pin hole processing motor in a square array, and the splicing pin hole processing motor is connected with a vertically oriented splicing pin hole processing bit.

Further, the square groove processing device comprises a square groove processing seat connected to the processing conversion tube and provided with side plates on the front and rear, the square groove processing seat is provided with a front and rear movable device for the square groove processing, the front and rear movable device for the square groove processing is provided with an cylinder for the square groove processing and opening, the cylinder for the square groove processing and opening is provided with a cylinder head on both sides thereof which is connected with a rotary motor for the square groove processing, and the rotary motor for the square groove processing is provided with a grinding block for the square groove processing.

Further, the front and rear movable device for the square groove processing comprises a front and rear movable motor for the square groove processing disposed on the side plates on the front and rear of the square groove processing seat and a front and rear movable screw rod for the square groove processing, the front and rear movable screw rod for the square groove processing is sleeved with a front and rear movable connecting block for the square groove processing, the front and rear movable connecting block for the square groove processing is fixedly connected with upper part of the cylinder for the square groove processing and opening, the lower part of the cylinder for the square groove processing and opening is connected with a front and rear movable seat for the square groove processing, and the lower part of the front and rear movable seat for the square groove processing is cooperated with a front and rear movable chute for the square groove processing in the square groove processing seat through a front and back movable sliding rail for the square groove processing.

Further, the front and back movable seat for the square groove processing is provided with a movable sliding rail for the square groove processing and opening cooperated with the rotary motor for the square groove processing, and the left and right sides of the square groove processing seat are provided with a baffle plate for the square groove processing lower than the lower surface of the grinding block for the square groove processing.

Further, the wire mesh pin hole processing device comprises a wire mesh pin hole processing seat connected to the processing conversion tube, the wire mesh pin hole processing seat is provided with a cylinder for the wire mesh pin hole processing and opening, the cylinder for the wire mesh pin hole processing and opening is connected with a movable seat for the wire mesh pin hole processing and opening and the movable seat for the wire mesh pin hole processing and opening is cooperated with a moveable sliding rail for the wire mesh pin hole processing and opening on the wire mesh pin hole processing seat, the movable seat for the wire mesh pin hole processing and opening is provided side by side with a rotary motor for the wire mesh pin hole processing, and the rotary motor for the wire mesh pin hole processing is connected with a wire mesh pin hole processing bit.

Further, the lifting and clamping device comprises a lifting cylinder for clamping material on the mounting base for processing, the lifting cylinder for clamping material passes through the rack to be connected with a lifting seat for clamping material, and the lifting seat for clamping material is provided with two clamping material devices cooperated with the first splice plate or the second splice plate.

Further, the clamping material device comprises a groove seat for clamping material disposed on the lifting seat for clamping material and cooperated with the first splice plate or the second splice plate, the side plate of the groove seat for clamping material is provided with a mating screw hole for clamping material, and the clamping material device further comprises a pressing block for clamping material disposed on the first splice plate or the second splice plate and cooperated with a mating screw hole for clamping material to be locked through a locking bolt for clamping material.

The advantageous effects of the present invention are as follow:

The trimming and positioning device and the processing device are designed to be cooperated with each other, and the trimming and positioning device is able to complete the trimming of the side slits of the splice plates while positioning the two splice plates without interfering with the operation of the hole and groove processing device, which greatly improves the efficiency of integrated processing.

The design of the lifting seat for trimming and positioning is able to play a position limit role in the process of trimming and lifting, thereby avoiding damage to the splice plate when trimming.

The processing mechanism capable of lifting and multi-station conversion is able to realize continuously integrated processing for the splicing pin hole, the square groove and the wire mesh pin hole, which improves the efficiency and precision of processing.

The processing device for splicing pin hole is simple in structure, convenient in operation and able to synchronously process the splicing pin hole into square array, and avoids the vibration dislocation caused by the processing of a single bit.

The processing device for square groove is simple in structure, convenient in operation and able to ensure that the processing height of two square grooves is the same.

The front and rear movable device for the square groove processing is simple in structure, convenient in operation, smart in design and able to realize the front and rear activities without exceeding the height, thereby ensuring that the square groove does not interfere with the second splice plate during processing.

The design of the baffle plate for the square groove processing is able to intercept the debris in the square groove processing process and prevent the debris from affecting the activity of the front and rear movable device for the square groove processing while limiting the maximum opening position of the rotary motor for the square groove processing, thereby avoiding that square groove is processed too deep.

The wire mesh processing device is able to realize the wire mesh pin hole in a row of processing, thereby effectively ensuring the consistent height of the wire mesh pin, holes.

The lifting and clamping device is simple in structure and convenient in operation in which two clamping material devices are used to clamp and fix a splice plate, avoiding the shaking of the splice plate during processing.

The clamping material device is simple in structure, convenient in operation and able to adapt to a variety of thickness specifications of the splice plate clamping.

DETAILED DESCRIPTION OF THE ILLUSTRATED EMBODIMENTS

The text markup shown in the FIGURES are indicated as follows:
1—first splice plate;
2—second splice plate;
3—adhesive layer;
4—splicing wooden pin;
5—caulk compound layer of the first wall;
6—steel wire mesh;
7—concrete layer;
8—fixed bolt of the wire mesh;
9—caulk compound layer of the second wall;
21—rack;
22—mounting base for processing;
23—processing port;
24—lifting cylinder for clamping material;
25—lifting seat for clamping material;
26—groove seat for clamping material;
27—pressing block for clamping material;
28—locking bolt for clamping material;
29—mating screw hole for clamping material;
30—trimming and positioning device;
31—processing mechanism;
32—lifting cylinder for processing;
33—lifting mounting block for processing;
34—processing conversion shaft;
35—processing conversion tube;
36—splicing pin hole processing device;
37—wire mesh pin hole processing device;
38—square groove processing device;
39—splicing pin hole processing device;
40—splicing pin hole processing motor;
41—splicing pin hole processing bit;
42—square groove processing seat;
43—front and rear movable seat for the square groove processing;
44—front and back movable sliding rail for the square groove processing;
45—front and rear movable chute for the square groove processing;
46—cylinder for the square groove processing and opening;
47—front and rear movable motor for the square groove processing;
48—a front and rear movable screw for the square groove processing;
49—front and rear movable connecting block for the square groove processing;
50—rotary motor for the square groove processing;
51—grinding block for the square groove processing;
52—movable sliding rail for the square groove processing and opening;
53—baffle plate for the square groove processing;
54—wire mesh pin hole processing seat;
55—cylinder for the wire mesh pin hole processing and opening;
56—movable seat for the wire mesh pin hole processing and opening;
57—rotary motor for the wire mesh pin hole processing;
58—wire mesh pin hole processing bit;
59—moveable sliding rail for the wire mesh pin hole processing and opening;
61—lifting cylinder for trimming and positioning;
62—lifting seat for trimming and positioning;
63—lifting link for trimming and positioning;
64—mounting base for trimming and positioning;
65—first trimming knife;
66—second trimming knife;
67—processing mating port.

Specific Embodiments

In order to enable technicians in the art to better understand the technical solutions of the present invention, the following is a detailed description of the present invention combined with the accompanying drawings. The description in this part is only for demonstration and explanation, and should not limit the scope of protection of the present invention.

Figure 1:
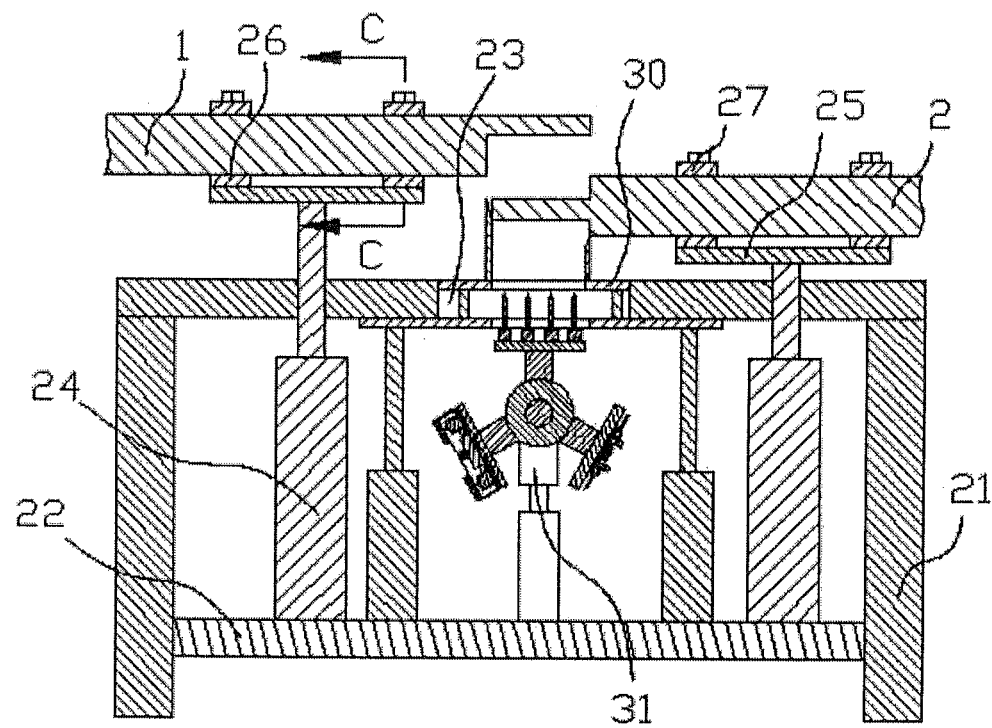
FIG. 1 shows a structural schematic diagram of an integrated processing machine for positioning, trimming and punching of the ceiling splicing structure.
Figure 2:
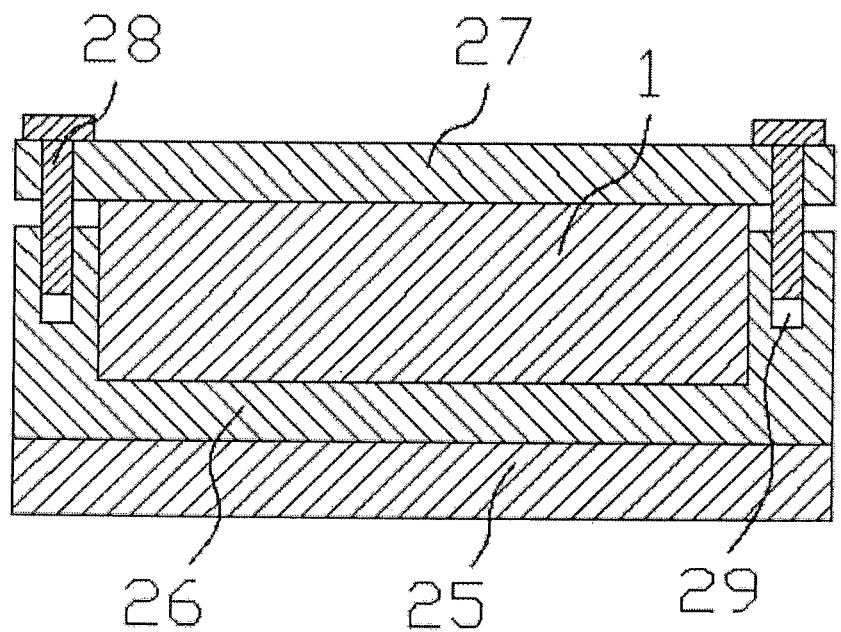
FIG. 2 shows the C-C section view in FIG. 1.
Figure 3:
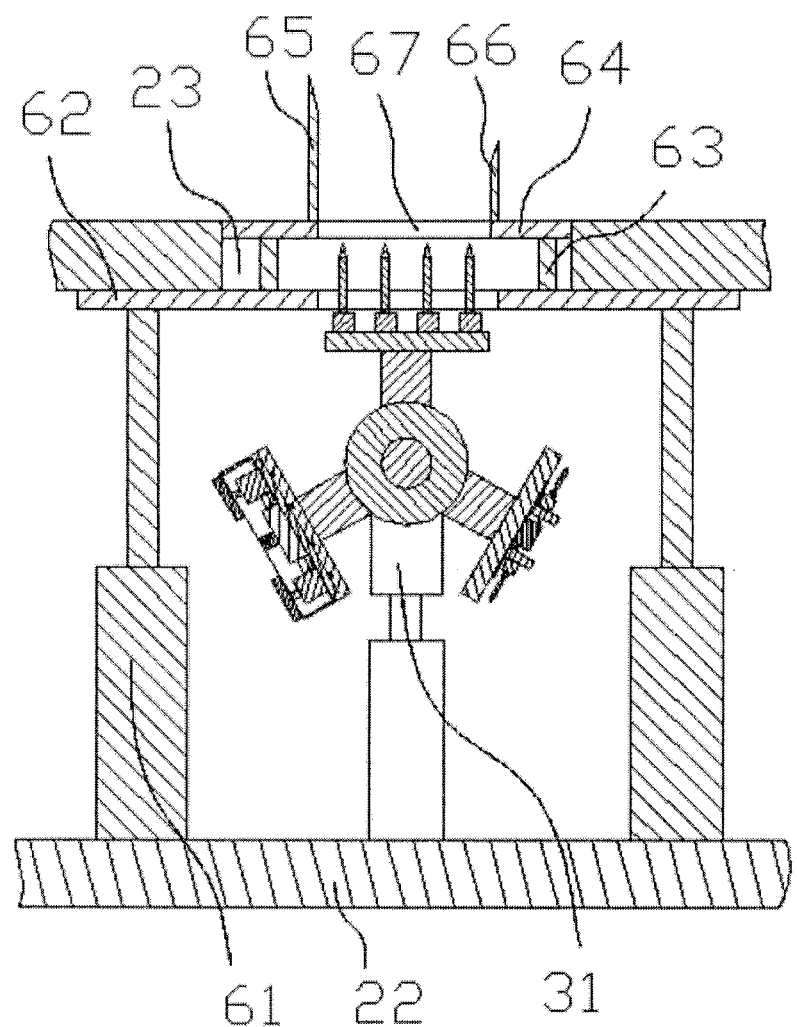
FIG. 3 shows the structure schematic diagram of the cooperation of the trimming and positioning device and the processing mechanism.
Figure 4:
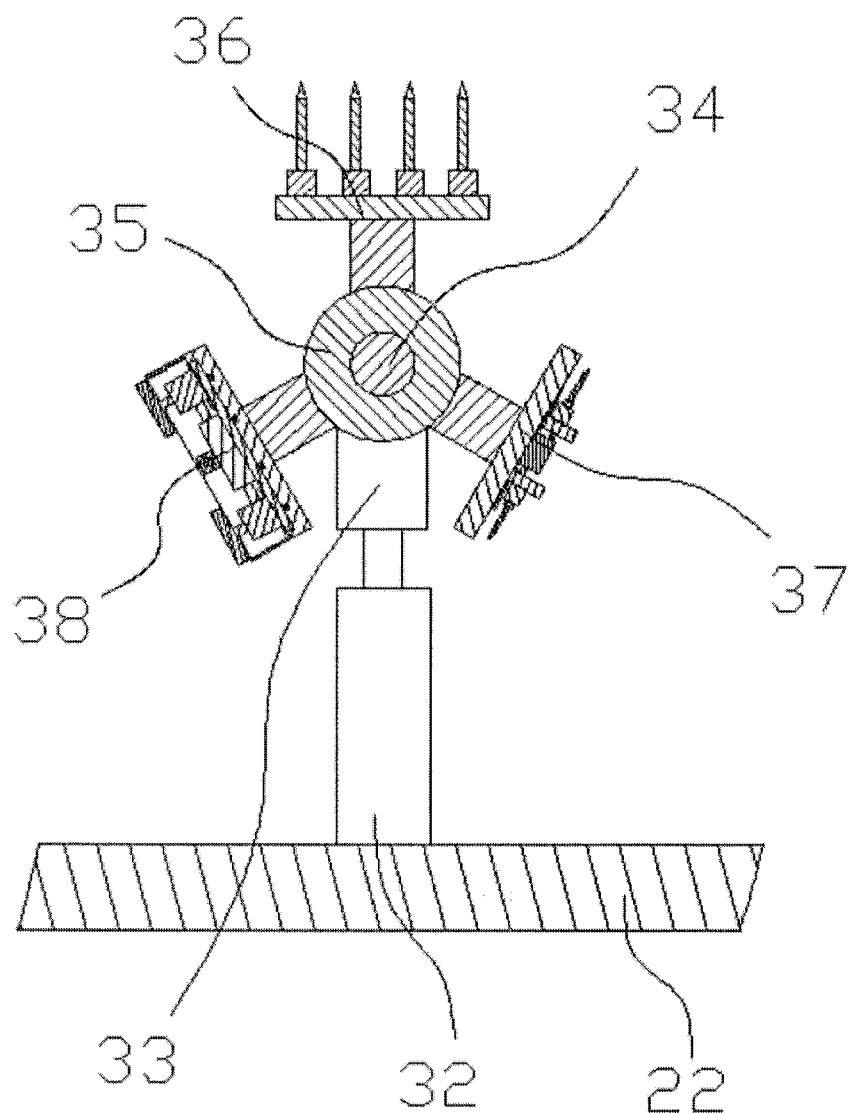
FIG. 4 shows the structure schematic diagram of the processing mechanism.
Figure 5:
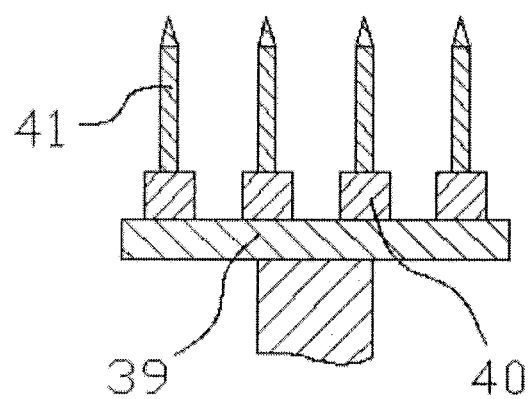
FIG. 5 shows the structure schematic diagram of the splicing pin hole processing device.
Figure 6:
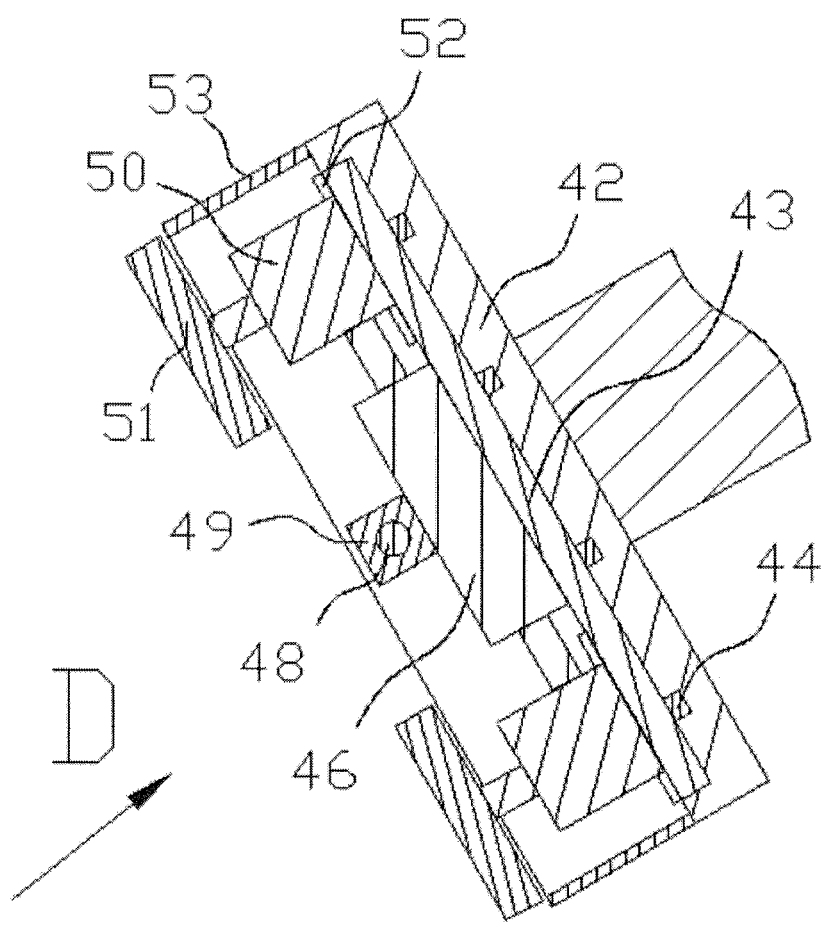
FIG. 6 shows a schematic diagram of the square groove processing device.
Figure 7:
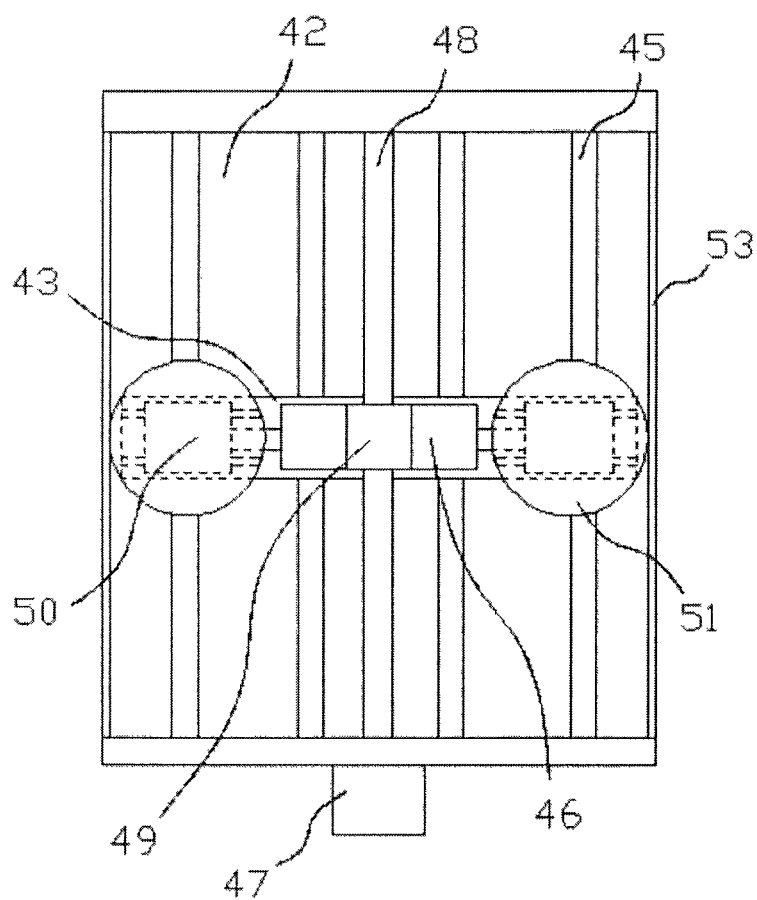
FIG. 7 shows the D-direction schematic diagram of FIG. 6.
Figure 8:
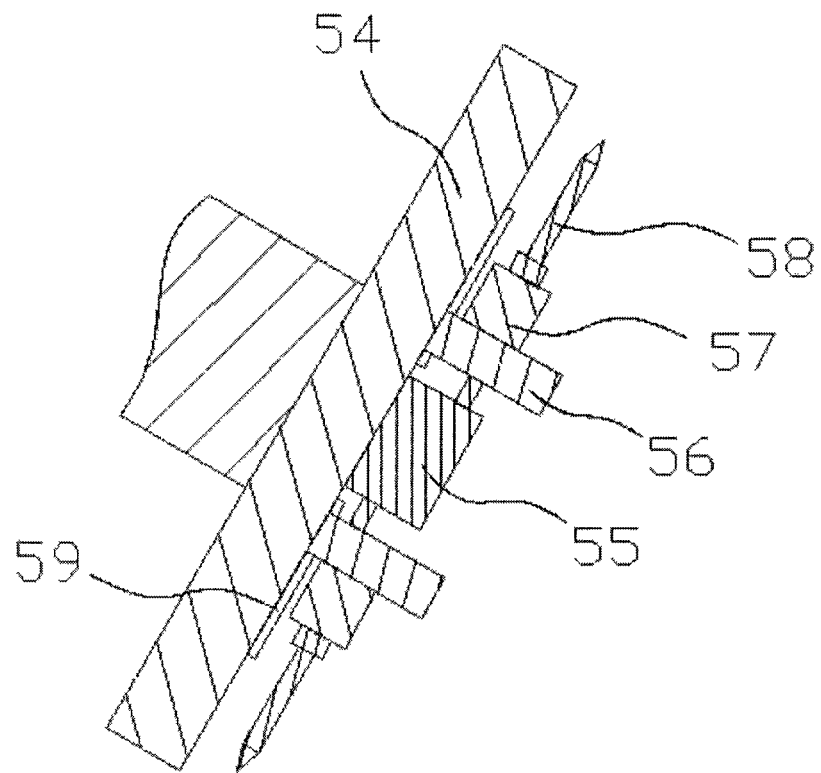
FIG. 8 shows the structure schematic diagram of the wire mesh pin hole processing.
Figure 9:
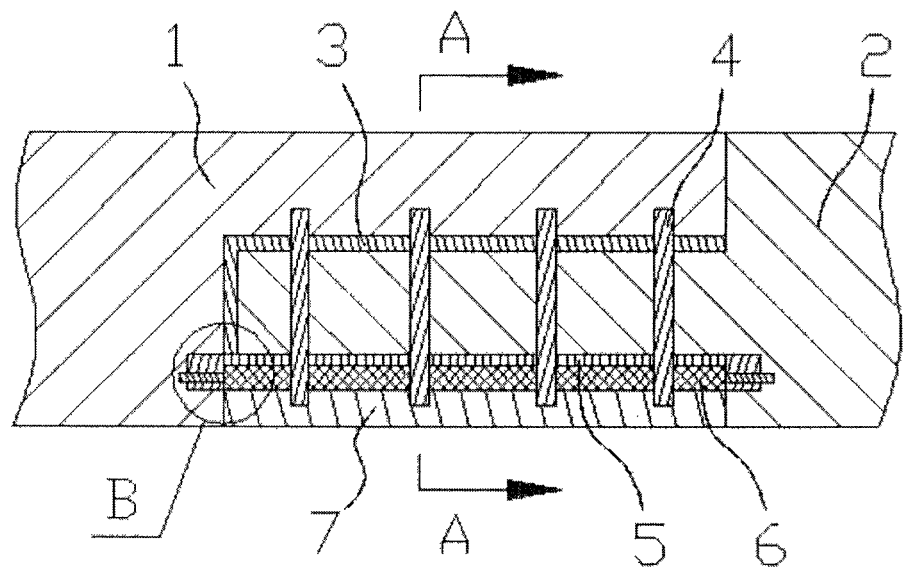
FIG. 9 shows the structural schematic diagram of the ceiling splicing structure.
Figure 10:
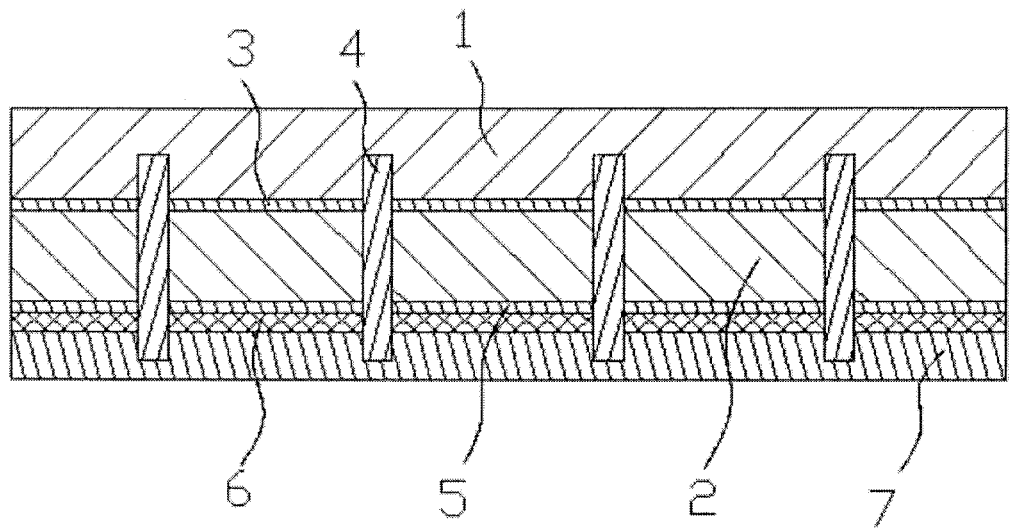
FIG. 10 shows the sectional view of A-A in FIG. 9.
Figure 11:
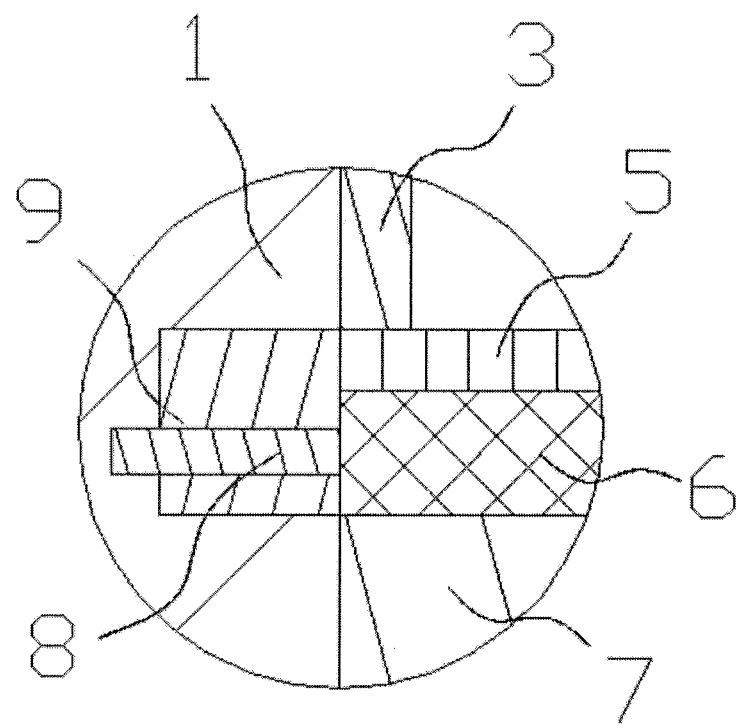
FIG. 11 shows the partial enlarged version of B in FIG. 9.
Figure 12:
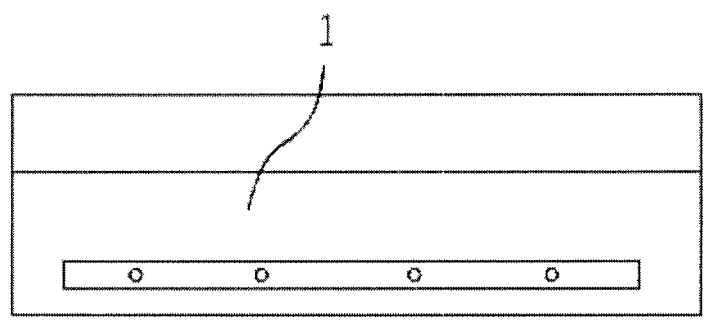
FIG. 12 shows the side view of the first splice panel.

As shown in FIGS. 1-12, in the present invention, an integrated processing machine for positioning, trimming and punching of the ceiling splicing structure comprises a rack (21) and a mounting base for processing (22) at the lower part of the rack (21), in which the mounting base for processing (22) is provided with a lifting and clamping device which passes through the rack to be cooperated with a first splice plate (1) or a second splice plate (2) on the upper part thereof, the upper part of the rack (21) is provided with a processing port (23), the processing port (23) is cooperated with a trimming and positioning device (30), the trimming and positioning device (30) comprises a lifting cylinder for trimming and positioning (61) disposed on the mounting base for processing (22), the lifting cylinder for trimming and positioning (61) is connected with a mounting base for trimming and positioning (64), the mounting base for trimming and positioning (64) is provided with a first trimming knife (65) and a second trimming knife (66) which are cooperated with two splice plates respectively, and the height difference between the first trimming knife (65) and the second trimming knife (66) is equal to the spacing difference between a first splicing block and a second splicing block and the bottom surface of the splice plate, the mounting base for trimming and positioning (64) is provided with a processing mating port (67), and the mounting base for processing (22) is provided with a processing mechanism (31) matched with the processing mating port (67) and cooperated with two splice plates.

Preferentially, the upper part of the lifting cylinder for trimming and positioning (61) is connected with a lifting seat for trimming and positioning (62), the mounting base for trimming and positioning (64) is mounted on the lifting seat for trimming and positioning (62) through lifting link for trimming and positioning (63), the size specification of the lifting seat for trimming and positioning (62) is larger than the size specification of the processing port (23), and the lifting seat for trimming and positioning (62) is also provided with a processing mating port (67).

Preferentially, the processing mechanism (31) comprises a lifting cylinder for processing (32) disposed on the mounting base for processing (22), the upper part of the lifting cylinder for processing (32) is connected with a lifting mounting block for processing (33), the lifting mounting block for processing (33) is provided with a processing conversion shaft (34) and the processing conversion shaft (34) is connected with a processing conversion motor, the processing conversion shaft (34) is sleeved with a processing conversion tube (35), and the processing conversion tube (35) is uniformly provided with a splicing pin hole processing device (36), a wire mesh pin hole processing device (37) and a square groove processing device (38) along the ring which are matched with the processing mating port (67).

Preferentially, the splicing pin hole processing device (36) comprises a splicing pin hole processing seat (39) disposed on the processing conversion tube (35) and matched with the processing port (23), the splicing pin hole processing seat (39) is provided with a splicing pin hole processing motor (40) in a square array, and the splicing pin hole processing motor (40) is connected with a vertically oriented splicing pin hole processing bit (41).

Preferentially, the square groove processing device (38) comprises a square groove processing seat (42) connected to the processing conversion tube (35) and provided with side plates on the front and rear, the square groove processing seat (42) is provided with a front and rear movable device for the square groove processing, the front and rear movable device for the square groove processing is provided with an cylinder for the square groove processing and opening (46), the cylinder for the square groove processing and opening (46) is provided with a cylinder head on both sides thereof which is connected with a rotary motor for the square groove processing (50), and the rotary motor for the square groove processing (50) is provided with a grinding block for the square groove processing (51).

Preferentially, the front and rear movable device for the square groove processing comprises a front and rear movable motor for the square groove processing (47) disposed on the side plates on the front and rear of the square groove processing seat (42) and a front and rear movable screw rod for the square groove processing (48), the front and rear movable screw rod for the square groove processing (48) is sleeved with a front and rear movable connecting block for the square groove processing (49), the front and rear movable connecting block for the square groove processing (49) is fixedly connected with upper part of the cylinder for the square groove processing and opening (46), the lower part of the cylinder for the square groove processing and opening (46) is connected with a front and rear movable seat for the square groove processing (43), and the lower part of the front and rear movable seat for the square groove processing (43) is cooperated with a front and rear movable chute for the square groove processing (45) in the square groove processing seat (42) through a front and rear movable sliding rail for the square groove processing (44).

Preferentially, the front and back movable seat for the square groove processing (43) is provided with an movable sliding rail for the square groove processing and opening (52) cooperated with the rotary motor for the square groove processing (50), and the left and right sides of the square groove processing seat (42) are provided with a baffle plate for the square groove processing (53) lower than the lower surface of the grinding block for the square groove processing (51).

Preferentially, the wire mesh pin hole processing device (37) comprises a wire mesh pin hole processing seat (54) connected to the processing conversion tube (35), the wire mesh pin hole processing seat (54) is provide with a cylinder for the wire mesh pin hole processing and opening (55), the cylinder for the wire mesh pin hole processing and opening (55) is connected with a movable seat for the wire mesh pin hole processing and opening (56) and the movable seat for the wire mesh pin hole processing and opening (56) is cooperated with a moveable sliding rail for the wire mesh pin hole processing and opening (59) on the wire mesh pin hole processing seat (54), the movable seat for the wire mesh pin hole processing and opening (56) is provided side by side with a rotary motor for the wire mesh pin hole processing (57), and the rotary motor for the wire mesh pin hole processing (57) is connected with a wire mesh pin hole processing bit (58).

Preferentially, the lifting and clamping device comprises a lifting cylinder for clamping material (24) on the mounting base for processing (22), the lifting cylinder for clamping material (24) passes through the rack (21) to be connected with a lifting seat for clamping material (25), and the lifting seat for clamping material (25) is provided with two clamping material devices cooperated with the first splice plate (1) or the second splice plate (2)

Preferentially, the clamping material device comprises a groove seat for clamping material (26) disposed on the lifting seat for clamping material (25) and cooperated with the first splice plate (1) or the second splice plate (2), the side plate of the groove seat for clamping material (26) is provided with a mating screw hole for clamping material (29), and the clamping material device further comprises a pressing block for clamping material (27) disposed on the first splice plate (1) or the second splice plate (2) and cooperated with a mating screw hole for clamping material (29) to be locked through a locking bolt for clamping material (28).

When the integrated processing machine for positioning, trimming and punching of the ceiling splicing structure is used specifically, the first splice plate (1) and the second splice plate (2) are placed on the corresponding groove seats for clamping material firstly, after that, the two splice plates are pushed toward each other to make two splice plates touch the first trimming knife (65) and the second trimming knife (66) respectively and the determination of the left and right positions of the splice plates is completed, then the pressing block for clamping material (27) and the groove seat for clamping material (26) are locked together through the locking bolt for clamping material (28), after then, through the lifting cylinder for clamping material (24), the two splice plates are driven down to make two trimming knives complete trimming the two plates while positioning the height of the two splice plates, after being positioned, the lifting cylinder for clamping material (24) is kept position unchanged and the mounting base for trimming and positioning (64) is driven down through the lifting cylinder for trimming and positioning (61), thereby the trimming knives are driven down to be apart from two splice plate, then through the processing conversion motor, the square groove processing device is converted to the lower part of the processing port (23), being lifted to a certain height through the lifting cylinder for processing (32), the rotary motor for the square groove processing (50) drives the grinding block for the square groove processing (51) to rotate, after that, through the cylinder for the square groove processing and opening (46), the rotary motor for the square groove processing (50) is moved to both sides to make grinding block for the square groove processing (51) process square groove on splicing plate in a rotary grinding way.

In this process, the front and rear movable motor for the square groove processing (47) works to drive the front and rear movable seat for the square groove processing (43) back and forth and the square groove processing is completed, during processing, the debris is prevented from entering into square groove processing seat (42) by the baffle plate for the square groove processing (53), after the processing of the square groove is completed, the machining mechanism is restored to its original position, then the wire mesh pin hole is converted to the lower part of the processing port (23), through the lifting cylinder for processing (32), the wire mesh pin hole processing seat (54) is driven to a certain height, after then the rotary motor for the wire mesh pin hole processing (57) is made to drive the wire mesh pin hole processing bit (58) work while the movable seat for the wire mesh pin hole processing and opening (56) is pushed toward both sides through cylinder for the wire mesh pin hole processing and opening (55), thereby completing the wire mesh pin hole processing, after that then, the lifting cylinder for clamping material (24) cooperated with the first splice plate is descended to make two splice plates stick together, then through the processing conversion motor, the splicing pin hole processing device (36) is rotated to a station that interfaces with the machining port (23) and the processing conversion shaft (34) is driven to rise through the lifting mounting block for processing (32), thereby driving the splicing pin hole processing seat (39) to rise while starting the splicing pin hole processing motor (40), during the rising process, the splicing pin hole processing is completed by the splicing pin hole processing bit and then the processing device is reset, thereby all the processing of the two splice plates is completed.

It should be understood that the term "comprises", "comprising" or any other variants thereof is intended to encompass a non-exclusive inclusion, such that a process, method, article, or device that comprises a plurality of elements includes not only those elements but also other elements that are not explicitly listed, or elements that are inherent to such a process, method, item, or device.

The principles and embodiments of the present invention have been described herein with reference to specific examples, and the description of the above examples is only to aid in understanding the method of the present invention and its core idea. The above description is only a preferred embodiment of the present invention, and it should be noted that due to the finiteness of the textual expression, there is an infinitely specific structure objectively. It will be apparent to those skilled in the art that a number of modifications, modifications, or variations may be made without departing from the principles of the invention, and the technical features described above may be combined in an appropriate manner; These improvements, modifications, or combinations, or the direct application of the inventive concepts and technical solutions to other applications without modification, should all be considered to be within the scope of the present invention.

What is claimed is:

1. An integrated processing machine for positioning, trimming and punching of ceiling splicing structure, the integrated processing machine comprising:
a rack (21); and
a mounting base (22) for processing, the mounting base located at a lower part of the rack (21),
wherein the mounting base (22) for processing is provided with a lifting and clamping device for lifting and clamping a first splice plate (1) or a second splice plate (2), which lifting and clamping device passes through the rack to cooperate with the first splice plate (1) or the second splice plate (2) at an upper part of the rack,
wherein the upper part of the rack (21) is provided with a processing port (23), which processing port (23) cooperates with a trimming and positioning device (30),
wherein the trimming and positioning device (30) comprises a lifting cylinder (61) for trimming and positioning, the lifting cylinder (61) for trimming and positioning being disposed on the mounting base (22) for processing,
wherein the trimming and positioning device (30) further comprises: a mounting base (64) for trimming and positioning; a first trimming knife (65); a second trimming knife (66), and a processing mating port (67);
wherein the lifting cylinder (61) for trimming and positioning is connected with the mounting base (64) for trimming and positioning in order to lift the first (65) and second (66) trimming knives towards the first (1) and second (2) splice plates, and in order to lower the first (65) and second (66) trimming knives away from the first (1) and second (2) splice plates,
wherein the mounting base (64) for trimming and positioning is provided with the first trimming knife (65) and the second trimming knife (66) which each cooperate with a respective one of the two splice plates (1, 2), and
wherein a fixed height difference between the first trimming knife (65) and the second trimming knife (66) equals the spacing difference between: (i) a bottom surface of a first splicing block of the first splice plate (1) and (ii) a bottom surface of the second splice plate,
wherein the mounting base (64) for trimming and positioning is provided with the processing mating port (67), and
wherein the mounting base (22) for processing is provided with a processing mechanism (31) matching with the processing mating port (67) and cooperating with the first and the second splice plates.

2. The integrated processing machine for positioning, trimming and punching of the ceiling splicing structure in accordance with the claim 1, wherein an upper part of the lifting cylinder (61) for trimming and positioning is connected with a lifting seat (62) for trimming and positioning, the mounting base (64) for trimming and positioning is mounted on the lifting seat (62) for trimming and positioning via a lifting link (63) for trimming and positioning, wherein a size of the lifting seat (62) for trimming and positioning is larger than a size of the processing port (23) of the upper part of the rack (21), and the lifting seat (62) for trimming and positioning is provided with a further processing mating port (67).

3. The integrated processing machine for positioning, trimming and punching of the ceiling splicing structure in accordance with the claim 1, wherein the processing mechanism (31) comprises a lifting cylinder (32) for processing, the lifting cylinder (32) for processing being disposed on the mounting base (22) for processing, wherein an upper part of the lifting cylinder (32) for processing is connected with a lifting mounting block (33) for processing, the lifting mounting block (33) for processing is provided with a processing conversion shaft (34), and the processing conversion shaft (34) is connected with a processing conversion motor, the processing conversion shaft (34) is sleeved with a processing conversion tube (35), and the processing conversion tube (35) is uniformly provided with: (i) a splicing pin hole processing device (36), (ii) a wire mesh pin hole processing device (37), and (iii) a square groove processing device (38), the splicing pin hole processing device (36), the wire mesh pin hole processing device (37), and the square groove processing device (38) all being along the processing conversion tube (35) and being configured to be selectively brought into proximity with the processing mating port (67).

4. The integrated processing machine for positioning, trimming and punching of the ceiling splicing structure in accordance with the claim 3, wherein the splicing pin hole processing device (36) comprises a splicing pin hole processing seat (39) disposed on the processing conversion tube (35) so as to be selectively brought into proximity with the processing port (23) of the upper part of the rack (21), the splicing pin hole processing seat (39) is provided with a splicing pin hole processing motor (40), and the splicing pin hole processing motor (40) is connected with a vertically oriented splicing pin hole processing bit (41).

5. The integrated processing machine for positioning, trimming and punching of the ceiling splicing structure in accordance with the claim 4, wherein the square groove processing device (38) comprises a square groove processing seat (42) connected to the processing conversion tube (35) and provided with side plates on a front and rear of the square groove processing device (38), the square groove processing seat (42) is provided with a front and rear movable device for square groove processing, the front and rear movable device for the square groove processing is provided with a cylinder (46) for the square groove processing, the cylinder (46) for the square groove processing is provided with a respective cylinder head on each of two sides thereof, which cylinder heads are each connected with a respective rotary motor (50) for the square groove processing, and each of the rotary motors (50) for the square groove processing are provided with a respective grinding block (51) for the square groove processing.

6. The integrated processing machine for positioning, trimming and punching of the ceiling splicing structure in accordance with the claim 5,
wherein the front and rear movable device for the square groove processing comprises a front and rear movable motor (47) for the square groove processing,
wherein the front and rear movable motor (47) is disposed on one of the side plates, and the front and rear movable device further comprises a front and rear movable screw rod (48) for the square groove processing,
wherein the front and rear movable screw rod (48) for the square groove processing is sleeved with a front and rear movable connecting block (49) for the square groove processing,
wherein the front and rear movable connecting block (49) for the square groove processing is fixedly connected with part of the cylinder (46) for the square groove processing, and another part of the cylinder (46) for the square groove processing is connected with a front and rear movable seat (43) for the square groove processing, and
wherein the front and rear movable seat (43) for the square groove processing cooperates, in the square groove processing seat (42) via a sliding rail (44), with a front and rear chute (45) for the square groove processing.

7. The integrated processing machine for positioning, trimming and punching of the ceiling splicing structure in accordance with the claim 6, wherein the front and rear movable seat (43) for the square groove processing is provided with a movable sliding rail (52) for the square groove processing, which movable sliding rail (52) cooperates with one of the rotary motors (50) for the square groove processing, and left and right sides of the square groove processing seat (42) are each provided with a respective baffle plate (53) for the square groove processing, which baffle plates (53) are provided so as to be located between the square groove processing seat (42) and a surface of each of the grinding blocks (51) for the square groove processing.

8. The integrated processing machine for positioning, trimming and punching of the ceiling splicing structure in accordance with the claim 3,
wherein the wire mesh pin hole processing device (37) for wire mesh pin hole processing comprises a wire mesh pin hole processing seat (54) connected to the processing conversion tube (35),
wherein the wire mesh pin hole processing seat (54) is provided with a cylinder (55) for the wire mesh pin hole processing,
wherein the cylinder (55) for the wire mesh pin hole processing is connected with a movable seat (56) for the wire mesh pin hole processing, and
wherein the movable seat (56) for the wire mesh pin hole processing cooperates with a sliding rail (59) for the wire mesh pin hole processing that is located on the wire mesh pin hole processing seat (54),
wherein the movable seat (56) for the wire mesh pin hole processing is provided side by side with a rotary motor (57) for the wire mesh pin hole processing, and
wherein the rotary motor (57) for the wire mesh pin hole processing is connected with a wire mesh pin hole processing bit (58).

9. The integrated processing machine for positioning, trimming and punching of the ceiling splicing structure in accordance with the claim 1, wherein the lifting and clamping device comprises a lifting cylinder (24) for lifting the first splice plate (1) or the second splice plate (2), the lifting cylinder (24) for lifting the first (1) or second (2) splice plate being provided on the mounting base (22) for processing, wherein the lifting cylinder (24) for lifting the first splice plate (1) or the second splice plate (2) passes through the rack (21) to be connected with a lifting seat (25) for supporting the first splice plate (1) or the second splice plate (2), and the lifting seat (25) for supporting the first splice plate (1) or the second splice plate (2) is provided with a clamping device that cooperates with the first splice plate (1) or the second splice plate (2) to clamp the first splice plate (1) or the second splice plate (2).

10. The integrated processing machine for positioning, trimming and punching of the ceiling splicing structure in accordance with the claim 9, wherein the clamping device comprises a groove seat (26) for clamping the first splice plate (1) or the second splice plate (2), which groove seat (26) is disposed on the lifting seat (25) for supporting the first splice plate (1) or the second splice plate (2), which groove seat (26) cooperates with the first splice plate (1) or the second splice plate (2), and a side plate of the groove seat (26) is provided with a mating screw hole (29) for clamping the first splice plate (1) or the second splice plate (2), and the clamping device further comprises a pressing block (27) for clamping the first splice plate (1) or the second splice plate (2), which pressing block (27) is disposed on the first splice plate (1) or the second splice plate (2) and cooperates with a locking bolt (28) that mates with the mating screw hole (29) for clamping the first splice plate (1) or the second splice plate (2).

* * * * *